United States Patent [19]

Morgulis et al.

[11] Patent Number: 4,923,238

[45] Date of Patent: May 8, 1990

[54] SUNSHIELDING ACCESSORY FOR MOTOR VEHICLES

[76] Inventors: Alexander Morgulis, Ezra Hasopher 11/10, Herzlia; Menahem Tilman, 34 Shaldag St., Hofit; David Shemes, 48/10 Hodem, Giloh, Jerusalem, all of Israel

[21] Appl. No.: 332,140

[22] Filed: Apr. 3, 1989

[51] Int. Cl.⁵ .............................................. B60J 3/00
[52] U.S. Cl. ................... 296/97.6; 296/97.8
[58] Field of Search ........................... 296/97.8, 97.6; 160/370.2

[56] References Cited

U.S. PATENT DOCUMENTS

| | | | |
|---|---|---|---|
| 3,371,955 | 3/1968 | Herrington, Sr. | 296/97.8 |
| 3,415,569 | 12/1968 | Leevo | 296/97.6 |
| 4,058,340 | 11/1977 | Pinkas | 296/97.6 |
| 4,248,474 | 2/1981 | Mandrick | 296/97.6 |
| 4,824,161 | 4/1989 | Lee | 296/97.8 |

*Primary Examiner*—Robert R. Song
*Attorney, Agent, or Firm*—Benjamin J. Barish

[57] ABSTRACT

A sunshielding accessory for motor vehicles, includes a sun visor panel for pivotal mounting to the vehicle above the windshield to either an upper inoperative position overlying the windshield, or to a lower operative position covering only an upper portion of the windshield; and an assembly of sunshield panels carried by the sun visor panel. The sunshield panels are joined to each other in accordion fashion and are foldable along fold lines against each other into a folded inoperative form depending below the sun visor panel, with the fold lines extending perpendicularly to the longitudinal axis of the sun visor panel, against the sun visor panel, or to an extended operative form to cover a substantial portion of the windshield below the sun visor panel when the latter is in its lower operative position. Retainer means releasably retains the sunshield panels in their folded inoperative form against the sun visor panel.

19 Claims, 1 Drawing Sheet

SUNSHIELDING ACCESSORY FOR MOTOR VEHICLES

BACKGROUND OF THE INVENTION

The present invention relates to a sunshielding accessory for motor vehicles, and particularly to such an accessory that may be included or attached to the motor vehicle in order to reduce the penetration of solar radiation through the vehicle windshield.

A motor vehicle standing in the sun becomes considerably heated in its interior because of the passage of the solar radiations through the windshield, particularly on hot sunny days. Many forms of sunshields have been devised to be placed against the inner face of the windshield in order to block solar radiation, but the known sunshields are generally inconvenient to apply, remove and store when not in use, and/or are relatively expensive.

An object of the present invention is to provide a new sunshielding accessory which is convenient to apply, remove and store when not in use, and which is also of relatively simple construction capable of production in volume and at low cost.

BRIEF SUMMARY OF THE INVENTION

According to the present invention, there is provided a sunshielding accessory for motor vehicles, comprising: a sun visor panel for pivotal mounting to the vehicle above the windshield to either an upper inoperative position overlying the windshield, or to a lower operative position covering only an upper portion of the windshield; and an assembly of sunshield panels carried by the sun visor panel. The sunshield panels are joined to each other in accordion fashion and are foldable along fold lines against each other into a folded inoperative form against the sun visor panel, or to an extended operative form depending below the sun visor panel, with the fold lines extending perpendicularly to the longitudinal axis of the sun visor panel, to cover a substantial portion of the windshield below the sun visor panel when the latter is in its lower operative position. Retainer means are provided for releasably retaining the sunshield panels in their folded inoperative form against the sun visor panel.

According to further features of the invention, the sunshield panels are pivotally mounted to one end of the sun visor panel to either the folded inoperative form of the sunshield panels wherein their longitudinal axes are parallel to that of the sun visor panel, or to the extended operative form of the sunshield panels wherein their longitudinal axes are perpendicular to that of the sun visor panel. In addition, each of the sunshield panels has a length and width generally about the same as, but preferably slightly less than, the sun visor panel, but the combined widths of the sunshield panels are at least equal to the length of the sun visor panel. In the described preferred embodiment, the combined widths of the sunshield panels are substantially greater than the length of the sun visor panel.

According to still further features of the invention, the retainer means comprises a retainer clip mounted to the sun visor panel for releasably engaging the sunshield panel when in their folded inoperative form. Further retainer means are provided comprising a pin carried by the end of the sunshield panels remote from their pivotal mounting to the sun visor panel, and a notch in the end of the sun visor panel remote from the pivotal mounting of the sunshield panels to the sun visor panel for releasably receiving the pin.

As will be more apparent from the description below, a sunshielding accessory constructed in accordance with the foregoing features may be carried by the vehicle in a very convenient manner when not in use, and may be conveniently moved to its operative or inoperative position when and as desired. In addition, such a sunshielding accessory may be manufactured in volume and at low cost.

Further features and advantages of the invention will be apparent from the description below.

BRIEF DESCRIPTION OF THE DRAWING

The invention is herein described, by way of example only, with reference to the accompanying drawings, wherein.

DESCRIPTION OF A PREFERRED EMBODIMENT

Figure 1:
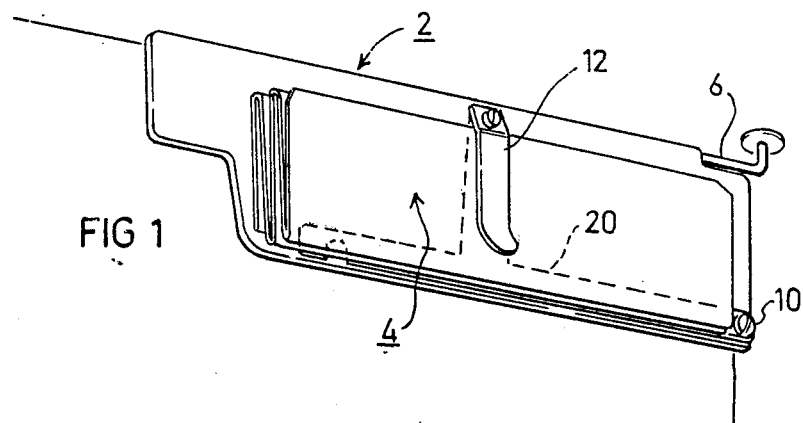
FIG. 1 illustrates one form of sunshielding accessory constructed in accordance with the present invention, the accessory being shown in its folded inoperative position.

The sunshielding accessory illustrated in the drawings comprises two main parts, namely a sun visor, generally designated 2, and an assembly of sunshield panels, generally designated 4. Sun visor 2 may of a conventional panel construction pivotally mounted by a bar 6 passing through the upper end of the panel to either an upper inoperative position overlying the windshield, or to a lower operative position (the position shown in FIG. 1) covering only an upper portion of the windshield. The assembly of sunshield panels 4 are joined to each other in accordion fashion and are foldable along fold lines 8 against each other into either a folded inoperative form to lie against the sun visor panel 2, as illustrated in FIG. 1, or to an extended operative form, as illustrated in FIG. 3, to cover a substantial portion of the windshield below the sun visor panel when the latter panel is in its lower operative position.

Figure 3:
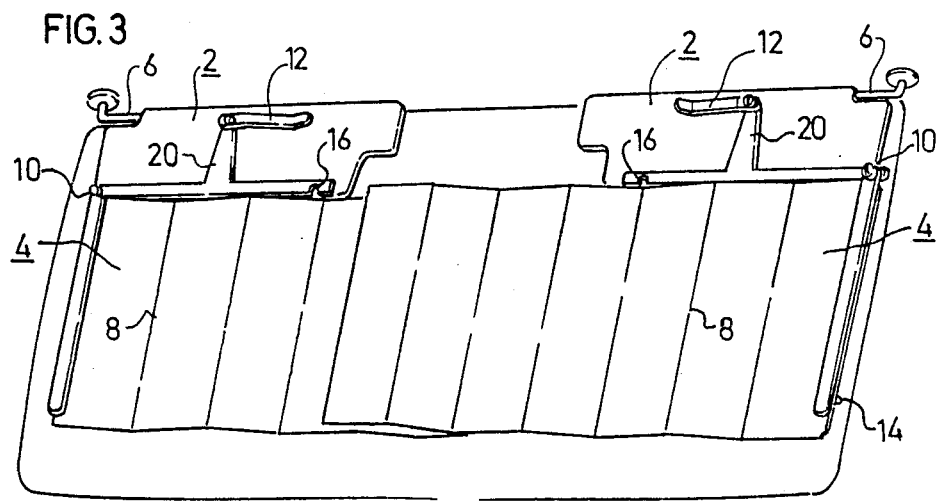
FIG. 3 illustrates two sunshielding accessories in a motor vehicle, the accessories being shown in their open operative positions to cover substantially the complete windshield against the penetration of solar radiation.

As FIG. 3 illustrates, two such sunshielding accessories may be provided in a motor vehicle for the conventional sun visor panels on opposite sides of the windshield. It will be seen that the two sunshield panels cover substantially the complete surface of the windshield when the sunshield panels are in their open operative form.

Figure 2:
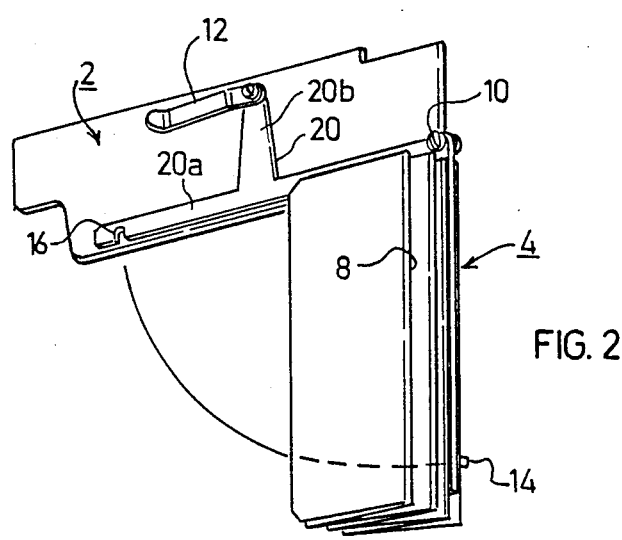
FIG. 2 illustrates the manner of opening the sunshield panels to their operative positions.

The sunshield panels 4 are pivotally mounted to one end of the sun visor panel 2 by a pivot pin 10 passing through the outer corner of the sunshield panel 4 adjacent to the sun visor panel 2. Pin 10 thus permits the sunshield panels 4, when in their folded condition, to be pivoted in alignment with the sun visor panel 2 as shown in FIG. 1, or to extend perpendicularly to the sun visor panel, as shown in FIG. 2, preparatory to opening the sunshield panels to their extended operative condition as illustrated in FIG. 3. When the sunshield panels 4 are in their folded operative conditions, they are releasably retained against the sun visor panel 2 by a retainer clip 12, and also by a pin 14 carried at the lower end of the sunshield panel 4 adjacent to the sun visor panel 2 receivable within a notch 16 in the sun visor panel.

Each of the sunshield panels 4 has a length and a width generally about the same as the sun visor panel 2; preferably, both the width and length of the sunshield panels 4 are slightly less than that of the sun visor panel, so that in the folded inoperative form of the sunshield panels they do not project past the sun visor panel. However, the combined widths of the sunshield panels 4, when in their open unfolded condition as illustrated in FIG. 3, is at least equal to, and preferably substantially greater than, the length of the sun visor panel 2, so that when the sunshield panels are in their extended operative condition they cover substantially the complete surface of the windshield.

A rigid T-shaped member 20 is fixed to the inner face of the sun visor panel 2. Member 20 includes a long leg 20a extending longitudinally of the sun visor panel 2 and formed with the previously-mentioned notch 16 at one end, and with a hole at the opposite end for carrying the pivot pin 10. Rigid member 20 is further formed with a short leg 20b extending transversely of the sun visor panel 2 and pivotally mounts the retainer clip 16. Member 20 may be of strong plastic or of metal.

The manner of using the illustrated sunshield assembly will be apparent from the above description. Thus, while the vehicle is being driven, the sunshield panels 4 would be folded together and pivoted against the inner face of the sun visor panel 2, where they are retained by retainer clip 12 and by pin 14 received within notch 16. The sun visor panel 2 may then be used in its normal manner, i.e., pivoted upwardly out of alignment with the windshield when not in use, downwardly to cover the upper portion of the windshield, or laterally to cover the upper portion of the side window. Whenever the vehicle is to be parked and its windshield is to be shielded from the solar radiation, the sunshield panels 4 would be pivoted to their downward position, as illustrated in FIG. 2, and then extended to their open form as illustrated in FIG. 3. When two such assemblies are used, one for each visor as shown in FIG. 3, the combination of the two sunshield visors and two assemblies of sunshield panels cover substantially the complete surface, or at least a major portion, of the windshield.

The sunshield panels 4 may be incorporated with the sun visor panels 2 and supplied as a unit with the sun visor panels; alternatively, the sunshield panels may be supplied with appropriate attachment elements for attaching them to existing sun visor panels.

Many other variations, modifications and applications of the invention will be apparent.

What is claimed is:

1. A sunshielding accessory for motor vehicles, comprising:
   a sun visor panel for pivotal mounting to the vehicle above the windshield to either an upper inoperative position overlying the windshield, or to a lower operative position covering only an upper portion of the windshield;
   an assembly of sunshield panels carried by said sun visor panel, said sunshield panels being joined to each other in accordion fashion and being foldable along fold lines against each other into a folded inoperative form against said sun visor panel, or to an extended operative form depending below the sun visor panel, with the fold lines extending perpendicularly to the longitudinal axis of the sun visor panel, to cover a substantial portion of the windshield below the sun visor panel when the latter is in its lower operative position;
   and retainer means for releasably retaining said sunshield panels in their folded inoperative form against the sun visor panel.

2. The sunshielding accessory according to claim 1, wherein said sunshield panels are pivotally mounted to one end of the sun visor panel to either the folded inoperative form of the sunshield panels wherein their longitudinal axes are parallel to that of the sun visor panel, or to the extended operative form of the sunshield panels wherein their longitudinal axes are perpendicular to that of the sun visor panel.

3. The accessory according to claim 2, wherein each of said sunshield panels has a length and width generally about the same as the sun visor panel, the combined widths of the sunshield panels being at least equal to the length of the sun visor panel.

4. The accessory according to claim 3, wherein the combined widths of the sunshield panels are substantially greater than the length of the sun visor panel.

5. The accessory according to claim 1, wherein said retainer means comprises a retainer clip mounted to the sun visor panel for releasably engaging said sunshield panels when in their folded inoperative form.

6. The accessory according to claim 5, wherein said retainer clip is pivotally mounted to the sun visor panel from a position extending perpendicularly to the longitudinal axis of the sun visor panel for engaging the sunshield panels, or to a position extending substantially parallel to the longitudinal axis of the sun visor panel for disengaging the sunshield panels.

7. The accessory according to claim 1, wherein said retainer means comprises a pin carried by the end of said sunshield panels remote from their pivotal mounting to the sun visor panel, and a notch in the end of said sun visor panel remote from said pivotal mounting of the sunshield panels to the sun visor panel for releasably receiving said pin.

8. The accessory according to claim 7, wherein said notch is formed at one end of a rigid member secured to said sun visor panel, the opposite end of said rigid member pivotally mounting said sunshield panels.

9. The accessory according to claim 7, wherein said retainer means further comprises a retainer clip mounted to the sun visor panel for releasably engaging said sunshield panels when in their folded inoperative form, said clip being pivotally mounted to said rigid member.

10. The accessory according to claim 9, wherein said rigid member is of T-configuration, having a long leg extending longitudinally of the sun visor panel and formed with said notch at one end and with said pivotal mounting for the sunshield panels at its opposite end, and a short leg extending transversely of the sun visor panel and pivotally mounting said retainer clip.

11. A sunshielding accessory for motor vehicles, comprising:
    a sun visor panel for pivotal mounting to the vehicle above the windshield to either an inoperative position or to a operative position covering an upper portion of the windshield;
    an assembly of sunshield panels joined to each other in accordion fashion and foldable along fold lines against each other into a folded inoperative form against said sun visor panel, or to an extended operative form depending below the sun visor panel, with the fold lines extending perpendicularly to the longitudinal axis of the sun visor panel, to cover a substantial portion of the windshield below the sun visor panel when the latter is in its operative position;

each of said sunshield panels having a length and width generally about the same as the sunshield panels, the combined widths of the sunshield panels being at least equal to the length of the sun visor panel;

and retainer means for releasably retaining said sunshield panels in their folded inoperative form against the sun visor panel.

12. The accessory according to claim 11, wherein said sunshield panels are pivotally mounted to one end of the sun visor panel to either the folded inoperative form of the sunshield panels wherein their longitudinal axes are parallel to that of the sun visor panel, or the extended operative form of the sunshield panels wherein their longitudinal axes are perpendicular to that of the sun visor panel.

13. The accessory according to claim 11, wherein said retainer means comprises a retainer-clip mounted to the sun visor panel for releasably engaging said sunshield panels when in their folded inoperative form.

14. The accessory according to claim 11, wherein said sunshield panels are pivotally mounted to one end of the sun visor panel, said retainer means comprising a pin carried by one end of said sunshield panels remote from its pivotal mounting to the sun visor panel, the end of said sun visor panel remote from said pivotal mounting of the sunshield panels to the sun visor panel being formed with a notch for releasably receiving said pin.

15. The accessory according to claim 14, wherein said retainer means further comprises a retainer clip mounted to the sun visor panel for releasably engaging said sunshield panels when in their folded inoperative form.

16. The accessory according to claim 11, wherein the combined widths of the sunshield panels are substantially greater than the length of the sun visor panel.

17. A sunshielding accessory for motor vehicles, comprising:

a sun visor panel for pivotal mounting to the vehicle above the windshield to either an inoperative position or to a operative position covering an upper portion of the windshield;

an assembly of sunshield panels joined to each other in accordion fashion and foldable to either a folded inoperative form against the sun visor panel, or to an extended operative form depending below the sun visor panel, with the fold lines extending perpendicularly to the longitudinal axis of the sun visor panel, to cover a substantial portion of the windshield below the sun visor panel when the latter is in its operative position;

pivotal means for pivotally mounting said assembly of sunshield panels to said sun visor panel;

and a retainer clip carried by the sun visor panel for releasably engaging said sunshield panels when in their folded inoperative form.

18. The accessory according to claim 17, further including a pin carried by the end of the sunshield panels remote from their pivotal mounting to the sun visor panel, and a notch in the end of said sun visor panel remote from said pivotal mounting of the sunshield panels to the sun visor panel for releasably receiving said pin.

19. The accessory according to claim 17, wherein each of said sunshield panels has a length and width generally about the same as the sun visor panel, the combined widths of the sunshield panels being substantially greater than the length of the sun visor panel.

* * * * *